US012633566B2

(12) United States Patent
Tu et al.

(10) Patent No.: US 12,633,566 B2
(45) Date of Patent: May 19, 2026

(54) CASE-PUT-IN APPARATUS AND BATTERY ASSEMBLING DEVICE

(71) Applicant: CONTEMPORARY AMPEREX TECHNOLOGY (HONG KONG) LIMITED, Hong Kong (CN)

(72) Inventors: Yinhang Tu, Ningde City (CN); Shichuang Song, Ningde City (CN); Yangbo Li, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 519 days.

(21) Appl. No.: 18/305,159

(22) Filed: Apr. 21, 2023

(65) Prior Publication Data

US 2023/0261244 A1 Aug. 17, 2023

Related U.S. Application Data

(63) Continuation of application No. PCT/CN2022/099992, filed on Jun. 21, 2022.

(30) Foreign Application Priority Data

Sep. 27, 2021 (CN) .......................... 202122351080.3

(51) Int. Cl.
*H01M 10/04* (2006.01)
(52) U.S. Cl.
CPC ............................... *H01M 10/0404* (2013.01)
(58) Field of Classification Search
CPC ...... H01M 50/20; H01M 50/30; H01M 10/04; H01M 10/0404
See application file for complete search history.

(56) References Cited

U.S. PATENT DOCUMENTS

| | | | | |
|---|---|---|---|---|
| 1,669,054 A | * | 5/1928 | Elvira ..................... | H01M 6/08 |
| | | | | 53/239 |
| 3,799,321 A | * | 3/1974 | Agui ..................... | H01M 10/14 |
| | | | | 29/730 |
| 4,196,511 A | * | 4/1980 | Kolosov ................. | B23P 19/04 |
| | | | | 29/730 |

FOREIGN PATENT DOCUMENTS

| | | |
|---|---|---|
| CN | 106129447 A | 11/2016 |
| CN | 106684452 A | 5/2017 |

(Continued)

OTHER PUBLICATIONS

Machine Translation of: CN 112454255A, Ling et al., Mar. 9, 2021.*

(Continued)

*Primary Examiner* — Kenneth J Douyette
(74) *Attorney, Agent, or Firm* — Ladas & Parry, LLP

(57) ABSTRACT

A case-put-in apparatus for battery cell assembling is described. The battery cell includes an electrode assembly and a case. The apparatus includes a holding mechanism for holding the electrode assembly and/or the case, a driving mechanism for driving the holding mechanism to assemble a battery assembly into the case; a pressure detection mechanism for detecting a value of pressure on the holding mechanism; a displacement detection module for detecting a displacement of the holding mechanism; and a processing module communicatively connected to the pressure detection mechanism and the displacement detection module, and used to determine whether the assembling is abnormal according to the value of pressure and the displacement of the holding mechanism.

18 Claims, 2 Drawing Sheets

(56)        References Cited

FOREIGN PATENT DOCUMENTS

| CN | 107819146 A | 3/2018 |
| CN | 107825105 A | 3/2018 |
| CN | 112454255 A | 3/2021 |
| DE | 102011112535 A1 | 3/2013 |
| JP | H0876841 A | 3/1996 |
| WO | 2020007603 A1 | 1/2020 |

OTHER PUBLICATIONS

Machine Translation of: WO 2020/007603A, Lang et al., Jan. 2, 2020.*
Extended European Search Report for EP application No. 22871502. 5, dated May 27, 2024.
International Search Report dated Sep. 6, 2022 for Application No. PCT/CN2022/099992.
Office Action for EP application No. 22871502.5, dated Jun. 30, 2025.

* cited by examiner

CASE-PUT-IN APPARATUS AND BATTERY ASSEMBLING DEVICE

CROSS-REFERENCE TO RELATED APPLICATIONS

The present application is a continuation of International application PCT/CN2022/099992 filed on Jun. 21, 2022 which claims priority to Chinese Patent Application No. 202122351080.3, filed on Sep. 27, 2021, entitled "CASE-PUT-IN APPARATUS AND BATTERY ASSEMBLING DEVICE". The entire contents of these applications are incorporated herein by reference.

TECHNICAL FIELD

The present application relates to the field of battery assembling, and in particular, to a apparatus for facilitating an electrode assembly to be put into a case.

BACKGROUND ART

At present, the issue of environmental energy has made social progress face severe situations, and low-carbon environmental protection becomes a major theme of future economic development. The storage and efficient utilization of energy has attracted attention from all parties, and lithium-ion battery unit exist as the smallest unit of energy storage. The battery is a structural form in which a plurality of battery cells are effectively connected, and a certain number of battery cells are connected in series/parallel/parallel-series to meet the requirement of supplying power to an electrical device. In the production, transportation and encapsulation process of battery cells, assembling and encapsulating of battery assembly is required, and how to improve the success rate of battery assembling becomes a new problem.

SUMMARY OF THE INVENTION

The technical problem to be solved in the present application is to provide a apparatus for putting an electrode assembly in an assembling phase into a case, so as to solve the problem that errors cannot be reported effectively when an electrode assembly is put into a case in the prior art.

The present application is implemented as follows:

In one embodiment of the present application, a case-put-in apparatus for assembling a battery cell is provided, the battery cell comprises an electrode assembly and a case, the apparatus comprises a holding mechanism for holding the electrode assembly and/or the case; a driving mechanism for driving the holding mechanism to assemble a battery assembly into the case; a pressure detection mechanism for detecting a value of pressure on the holding mechanism; a displacement detection module for detecting a displacement of the holding mechanism; and a processing module communicatively connected to the pressure detection mechanism and the displacement detection module for determining whether the assembling is abnormal according to the value of pressure and the displacement of the holding mechanism.

By providing the holding mechanism, the electrode assembly and/or the case can be relatively fixed in space, and the driving mechanism drives the holding mechanism to allow the electrode assembly to be put into the case and perform assembling operation of case-put-in. By means of the pressure detection mechanism, a relative force on the holding mechanism can be reflected, and by means of the displacement detection module, the displacement amount of the holding mechanism can be reflected, thus, the relative position of the electrode assembly and the case can be reflected. By providing the processing module to communicate with the pressure detection mechanism and also communicate with the displacement detection module, it is capable of determining whether an abnormality occurs according to the relative force and the relative position simultaneously.

In another aspect of the present application, the holding mechanism comprises: a first holding mechanism for holding the electrode assembly; a second holding mechanism for holding the case; and a driving mechanism for driving at least one of the first holding mechanism and the second holding mechanism to move. The holding mechanism may only hold the electrode assembly or the case to move, or the first holding mechanism and the second holding mechanism may move toward each other to allow the electrode assembly to be put into the case. By designing two holding mechanisms, both the electrode assembly and the case of the battery assembly can be more stable, so that the assembling process is more efficient and less damaged.

In another aspect of the present application, the displacement detection module is connected with the second holding mechanism for detecting a displacement of the second holding mechanism. The displacement of the second holding mechanism can reflect the displacement of the case, which is suitable for use in an example in which the electrode assembly is fixed, and only the case is driven to move. It is more convenient and intuitive to detect the displacement of the second holding mechanism.

In another aspect of the present application, the displacement detection module comprises an adapter plate and a displacement sensor, the adapter plate is connected with the second holding mechanism, the adapter plate is horizontally disposed, and the displacement sensor is connected with the adapter plate.

By means of the horizontally disposed adapter plate, which is led out and connected with the displacement sensor, the space at a side of the case-put-in apparatus can be used, resulting in a more reasonable and compact layout.

In another aspect of the present application, the displacement detection module is connected with the first holding mechanism for detecting a displacement of the first holding mechanism. In an embodiment in which the second holding mechanism is stationary and the first holding mechanism moves, the displacement detection module is used to detect the displacement of the first holding mechanism, so that relative position information between the electrode assembly and the case can be acquired, which also achieves the technical effect of the detection of displacement.

In another aspect of the present application, the first holding mechanism is a platform, and the first holding mechanism supports the electrode assembly. The electrode assembly is placed on the platform, and the platform can be provided with a limiting member to prevent the electrode assembly from sliding horizontally, which also achieves the technical effect of holding the electrode assembly.

In another aspect of the present application, the second holding mechanism comprises a magnetic element and/or a clamping jaw and/or a chuck and/or an sticky element, and the second holding mechanism holds the case by the magnetic element and/or the clamping jaw and/or the chuck and/or the sticky element. In order to hold the case better, the second holding mechanism can be disposed in a plurality of different manners, and the case can be fixed by means of the magnetic element/clamping jaw/chuck/sticky element, so that the case can be more stable and the yield of case-put-in can be improved.

In another aspect of the present application, the second holding mechanism further comprises a pressure plate, the pressure plate is connected with the driving mechanism, and the driving mechanism is used to drive the pressure plate to move toward the first holding mechanism. By driving the electrode assembly through the pressure plate, the whole plane of the pressure plate can be in contact with the bottom surface of the case, which can ensure that the force is applied more uniformly during the driving process, so that the battery cell assembly is less likely to rub against the case, and finally the yield of the product is improved.

In another aspect of the present application, the processing module is communicatively connected to the driving mechanism, and the processing module is used to control start/stop of the driving mechanism based on determining whether the assembling is abnormal. By controlling the driving mechanism via the abnormality determining mechanism of the processing module, the abnormal situation of the case-put-in state can be fed back in time, so as to prevent the driving mechanism from further pressing the case during an abnormal situation and causing irreversible damage. Therefore, material cost is saved.

In another aspect of the present application, a battery assembling device comprising the above-mentioned case-put-in apparatus is provided. The battery assembling device is a machine for assembling a battery, and can perform various processes of battery production such as moving, case-put-in, auxiliary welding, encapsulating, and liquid injection, etc. By using the battery assembling device comprising the above-mentioned case-put-in apparatus, it is capable of determining whether the assembling is abnormal in time, so as to prevent bad materials from entering the next process, thereby improving the assembling efficiency of the case-put-in process, eliminating manual inspection step, and finally improving the production efficiency of the whole battery assembling work flow. Therefore, manpower can be saved.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific embodiments of the present application are exemplified below.

DESCRIPTION OF DRAWINGS

By reading the detailed description of the preferred embodiments below, various other advantages and benefits will become apparent to those of ordinary skill in the art. The drawings are merely for the purpose of illustrating the preferred embodiments, and are not considered to be limiting of the present application. Moreover, in all of the drawings, the same parts are indicated by the same reference numerals. In the drawings.

DESCRIPTION OF REFERENCE NUMERALS

Figure 1:
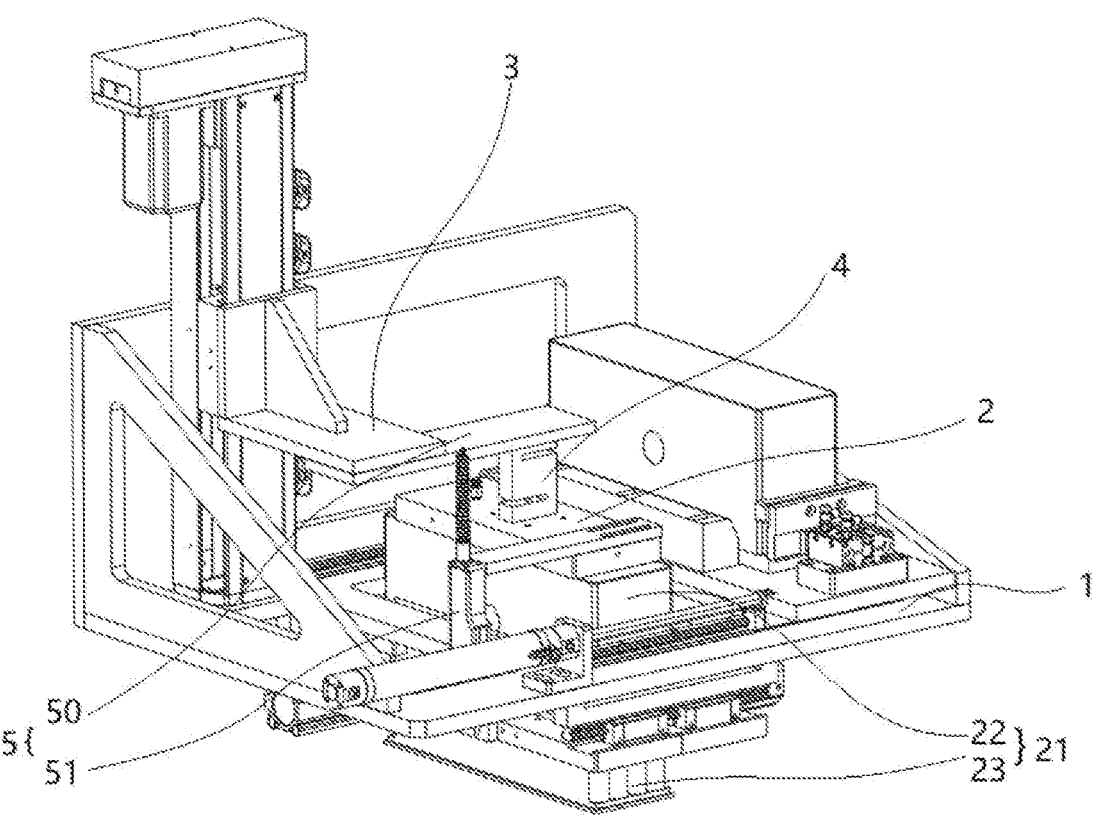
FIG. 1 is a schematic diagram of a case-put-in apparatus according to a specific embodiment of the present application.

1. first holding mechanism,
2. second holding mechanism,
21. battery cell,
22. case,
23. electrode assembly,
3. driving mechanism,
4. pressure detection mechanism,
5. displacement detection module,
50. adapter plate,
51. displacement sensor,
6. processing module.

DETAILED DESCRIPTION

Embodiments of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that three relationships may exist. For example, A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientation or position relationship indicated by the technical terms "center", "longitudinal", "transverse", "length", "width", "thickness", "upper," "lower," "front," "back," "left," "right," "vertical," "horizontal," "top," "bottom," "inner," "outer," "clockwise," "counterclockwise," "axial", "radial", "circumferential", etc. are based on the orientation or position relationship shown in the drawings and are intended to facilitate the description of the embodiments of the present application and simplify the description only, rather than indicating or implying that the apparatus or element referred to must have a particular orientation or be constructed and operated in a particular orientation, and therefore are not to be interpreted as limitations on the embodiments of the present application.

In the description of the embodiments of the present application, unless otherwise expressly specified and defined, the technical terms "mount," "join," "connect," "fix," etc. should be understood in a broad sense, such as, a fixed connection, a detachable connection, or an integral connection; a mechanical connection, or an electrical connection; a direct connection, an indirect connection through an intermediate medium, an internal communication of two elements, or interaction between two elements. For those of ordinary skill in the art, the specific meanings of the above terms in the embodiments of the present application can be understood according to specific situations.

At present, from the perspective of the development of the market situation, power batteries are more and more widely used. The power batteries are used in energy storage power source systems such as hydraulic, thermal, wind and solar power stations as well as in electric vehicles such as electric bicycles, electric motorcycles and electric cars, and military device and aerospace fields. With the continuous expansion of the application field of the power batteries, the market demand is also constantly expanding.

The inventor noticed that in the production, transportation and encapsulation process of battery cells, assembling and encapsulating of battery assembly is required, and how to improve the success rate of battery assembling becomes a new problem. During the battery assembling process, the electrode assembly needs to be covered with an insulating film outside, and welded to the top cover, and then putting into the case, during the process of putting into the case, the case may be in contact with the motor assembly, may be in contact with the insulating film, and may be in contact with the top cover. Improper assembling, mechanical disturbance or expansion and contraction at any stage may cause excessive friction, thereby damaging the assembly and resulting in scrap. The inventor of the present invention further noticed that, in some techniques used, there is also a step of providing feedback through a mechanism for detecting pressure, and determining whether the assembling is abnormal and needs to enter a scrap procedure according to the feedback pressure.

Although the above-mentioned apparatus is capable of detecting pressure and providing feedback, the inventor considers that during the battery assembling process, the electrode assembly needs to be covered with an insulating film outside, and welded to the top cover, and then putting into the case, during the process of putting into the case, the case may be in contact with the motor assembly, may be in contact with the insulating film, and may be in contact with the top cover. Different factors need to be considered in different processes, and therefore the criteria for determining device abnormality is also different, and it is infeasible to determine all situations simply by providing one pressure detection feedback mechanism. The accuracy of determining assembling abnormality of existing case-put-in apparatus is still not high enough.

Based on the considerations above, the inventor of the present application proposed to introduce more detection mechanisms to improve the accuracy of determining assembling abnormality of the case-put-in apparatus. For example, by providing a displacement detection mechanism to feed back the relative position information between the battery cell and the case, it is capable of determining whether the operation of the case-put-in apparatus is abnormal and whether the battery is damaged according to the relative position information and the pressure information simultaneously, thus improving the accuracy of determining of assembling of the case-put-in apparatus.

The case 22 described in the present application is an assembly for fitting with an end cover to form an internal environment of the battery cell 21, wherein the formed internal environment may be used to accommodate the electrode assembly 23, the electrolyte solution, and other components. The case 22 and the end cover may be separate components, an opening may be provided on the case 22, and the internal environment of the battery cell 21 is formed by covering the opening with the end cover. Without limitation, the end cover and the case 22 may be integrated, specifically, the end cover and the case 22 may form a common connection surface before putting other components into the case, and when the interior of the case 22 needs to be encapsulated, the case 22 can be covered with the end cover. The case 22 may be of a variety of shapes and sizes, such as rectangular parallelepiped, cylindrical, hexagonal prism, etc. Specifically, the shape of the case 22 may be determined according to the specific shape and size of the electrode assembly 23. The case 22 may be made of various materials, such as copper, iron, aluminum, stainless steel, aluminum alloy, and plastic, which is not particularly limited in the embodiments of the present application.

The electrode assembly 23 is a component in which an electrochemical reaction occurs in the battery cell 21. One or more electrode assemblies 23 may be included within case 22. The electrode assembly 23 is mainly formed by winding or stacking a positive electrode sheet and a negative electrode sheet, and a separator is usually provided between the positive electrode sheet and the negative electrode sheet. The portions of the positive electrode sheet and the negative electrode sheet having an active material constitute the main body part of the battery cell assembly, and the portions of the positive electrode sheet and the negative electrode sheet having no active material constitute tabs respectively. The positive tab and the negative tab may be located at one end of the main body part together or at either end of the main body part respectively. During the charging and discharging process of the battery, the positive electrode active material and the negative electrode active material react with the electrolyte solution, and the tabs are connected to the electrode terminals to form a current loop.

Embodiments of the present application provide an electrical apparatus that uses a battery as a power source, and the electrical apparatus may be, but is not limited to, a mobile phone, a tablet, a laptop, an electric toy, an electric tool, a battery vehicle, an electric vehicle, a ship, a spacecraft, and so on. The electric toy may include fixed or mobile electric toys, such as game consoles, electric car toys, electric ship toys, electric airplane toys, and the like. The spacecraft may include airplanes, rockets, space shuttles, spaceships, and the like.

In some embodiments of the present application, a battery assembling device comprising the above-mentioned case-put-in apparatus is provided. The battery assembling device is a machine for assembling a battery, and can perform various processes of battery production such as moving, case-put-in, auxiliary welding, encapsulating, and liquid injection, etc. The battery assembling device may include a grasping hand, a case-put-in apparatus, a positioning tool, a welding device, a film coating apparatus, a liquid injection apparatus, and the like. By using the battery assembling device comprising the above-mentioned case-put-in apparatus, it is capable of determining whether the assembling is abnormal in time, so as to prevent bad materials from entering the next process, thereby improving the assembling efficiency of the case-put-in process, eliminating manual inspection step. In a further embodiment, it is also possible to automatically scrap battery assembly with abnormal case-put-in situation according to the result of determining whether the assembling is abnormal, so as to improve the performance of production line automation. Finally, the production efficiency of the whole battery assembling work flow is improved. Therefore, manpower can be saved.

Figure 2:
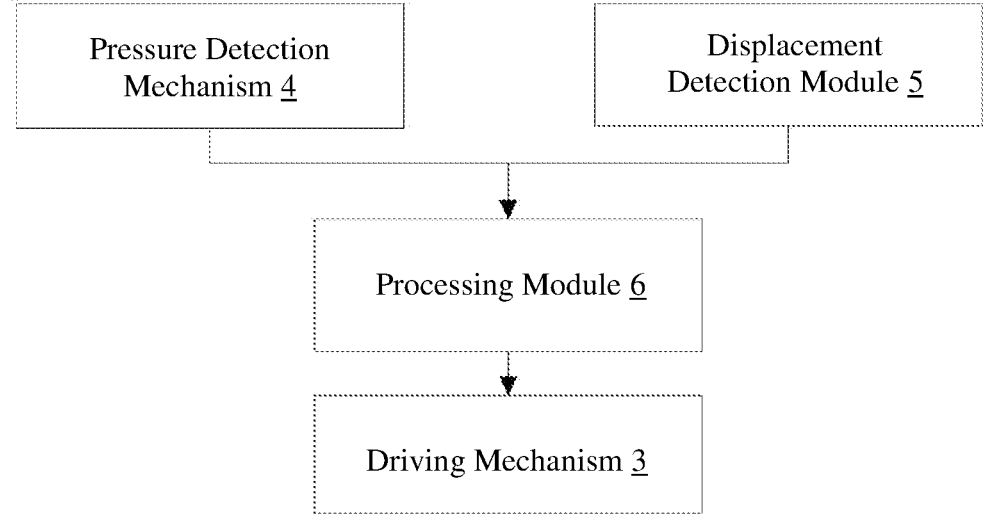
FIG. 2 is a circuit connection diagram according to a specific embodiment of the present application.

Refer to FIG. 1 and FIG. 2 for a specific solution of the present application, a case-put-in apparatus is used to assemble a battery cell, the battery cell includes an electrode assembly 23 and a case 22. The apparatus includes a holding mechanism for holding the electrode assembly 23 and/or the case 22; a driving mechanism 3 for driving the holding mechanism to assemble the electrode assembly 23 into the case 22; a pressure detection mechanism 4 for detecting a value of pressure on the holding mechanism; a displacement detection module 5 for detecting a displacement of the holding mechanism; and a processing module 6 (see FIG. 2) communicatively connected to the pressure detection mechanism 4 and to the displacement detection module 5, the processing module 6 determines whether the assembling is abnormal according to the value of pressure detected by the pressure detection mechanism 4 and a displacement of the holding mechanism detected by the displacement detection module 5.

The holding mechanism herein may be one or more of examples such as a clamping mechanism, a grasping mechanism, a supporting mechanism or a buckle mechanism, and the holding mechanism may only hold one of the electrode assembly 23 or the case 22, and the other may be fixed by using the prior art.

The driving mechanism 3 is used to provide power and drive the holding mechanism so that the case 22 and the electrode assembly 23 can be assembled. The driving mechanism 3 may be of electric drive, pneumatic drive, hydraulic drive, internal combustion engine drive, or the like. It is only necessary to meet the requirements for providing power.

The pressure detection mechanism 4 may be a pressure sensor, which is the most common sensor in industrial practice, and generally, the output of an ordinary pressure sensor is an analog signal, and the analog signal refers to a signal in which information parameters appear to be continuous within a given range. Or, within a continuous time interval, the feature amount of the representative information may be presented as a signal of any value at any instant.

The displacement detection module 5 is used to detect displacement of the holding mechanism, it may be connected with the first holding mechanism 1, or may be connected with the second holding mechanism 2, it is only needs to acquire relative displacement data between the first holding mechanism 1 and the second holding mechanism 2.

The processing module 6 herein may be a logic unit capable of performing electrical signal operation, such as CPU, PCB, PLC, or the like.

By providing the holding mechanism, the electrode assembly 23 and the case 22 can be relatively fixed in space, by driving the holding mechanism through the driving mechanism 3, the electrode assembly 23 can be put into the case 22, and assembling operation of case-put-in is performed. By means of the pressure detection mechanism 4, the relative force between the electrode assembly 23 and the case 22 can be reflected, by providing the displacement detection module 5, the displacement amount of the above-mentioned holding mechanism can be reflected, and the relative position between the electrode assembly and the case can also be reflected. By providing the processing module 6 to be communicatively connected to the pressure detection mechanism 4, and also be communicatively connected to the displacement detection module 5, the processing module 6 can receive more input signal as determining logic, thereby achieving the technical effect of determining whether there is an abnormality according to the relative force and the relative position simultaneously.

In conclusion, the solution of the present application improves the determining accuracy of the case-put-in process of the electrode assembly 23 by providing a case-put-in apparatus in which the displacement detection module 5 is connected with the processing module 6.

In some further embodiments of the present application, the holding mechanism includes: a first holding mechanism 1 for holding the electrode assembly 23; a second holding mechanism 2 for holding the case 22; and a driving mechanism 3 for driving at least one of the first holding mechanism 1 and the second holding mechanism 2 to move.

The first holding mechanism 1 is used to hold the posture of the electrode assembly 23, and may be configured to be one or more of examples such as a clamping mechanism, a grasping mechanism, a supporting mechanism, or a buckle mechanism, so as to limit the relative position between the electrode assembly 23 and the first holding mechanism 1. In some embodiments of the present scheme, the first holding mechanism 1 is generally disposed below the electrode assembly 23.

The second holding mechanism 2 is used to relatively fix the case 22, it may be configured to be one or more of examples such as a clamping mechanism, a grasping mechanism, a supporting mechanism, or a buckle mechanism, so as to limit the relative position between the case 22 and the second holding mechanism 2. In some embodiments of the present scheme, the second holding mechanism 2 generally fixes the case 22 from above.

The holding mechanism may allow the electrode assembly to be put into the case by moving the first holding mechanism 1 and the second holding mechanism 2 toward each other. The driving mechanism 3 is used to drive the relative motion of the two holding mechanisms. By designing two holding mechanisms, both of the electrode assembly 23 and the case 22 of the battery assembly can be more stable, so that the assembling process is more efficient and less damaged.

In another aspect of the present application, referring to FIG. 1, the displacement detection module 5 is connected with the second holding mechanism 2, and is used to detect the displacement of the second holding mechanism 2.

In a common arrangement, the first holding mechanism 1 is provided to remain stationary below, and the second holding mechanism 2 pressing the case 22 from above and moving toward the battery cell assembly. Thus, by directly detecting the second holding mechanism 2, the displacement of the case 22 can be reflected by the displacement of the second holding mechanism 2, which is suitable for the example in which the electrode assembly 23 is fixed, and only the case 22 is driven to move. It is more convenient and intuitive to detect the displacement of the second holding mechanism 2.

In some other embodiments of the present application, continue to refer to FIG. 1, the displacement detection module 5 includes an adapter plate 50 and a displacement sensor 51, the adapter plate 50 is connected with the second holding mechanism 2. The adapter plate 50 is horizontally disposed, and the displacement sensor 51 is connected with the adapter plate 50.

It can be seen from the figure that the second holding mechanism 2 needs to hold the case 22 in a space above the case 22 and the electrode assembly 23, and the space above is also used to connect the driving mechanism 3, thereby ensuring that it is not affected by other factors in the vertical movement direction. The horizontal adapter plate 50 extends laterally, extending a lateral space to accommodate the displacement sensor 51.

The horizontally disposed adapter plate 50 also ensures that the error of the displacement detection result is not too large. Otherwise, providing the displacement sensor 51 in the upper space of the case 22 will result in the case-put-in apparatus being too high, which in turn increases the risk of interference between assemblies resulting in inconvenient usage. By means of the horizontally disposed adapter plate 50, which is led out and connected with the displacement sensor 51, so that the space at a side of the case-put-in apparatus can be used, therefor the layout is more reasonable and compact.

In some other embodiments of the present application, the displacement detection module 5 is connected with the first holding mechanism 1, and is used to detect the displacement of the first holding mechanism 1.

In some situations, it can be ensured that the second holding mechanism 2 is stationary, only the first holding mechanism 1 moves forward, and in the embodiment in which the electrode assembly 23 is pushed into the case 22 from bottom to top, the displacement detection module 5 is used to detect the displacement of the first holding mechanism 1, so that the relative position information between the electrode assembly 23 and the case 22 can be obtained. It can also be the second holding mechanism 2 and the first holding mechanism 1 move separately, in this case, the displacement detection module 5 also needs to detect the displacement of the first holding mechanism 1, so as to detect the relative position information between the electrode assembly 23 and the case 22. The technical effect of displacement detection is also achieved.

In some other embodiments of the present application, refer to FIG. 1 for details, the first holding mechanism 1 is a platform, and the first holding mechanism 1 supports the electrode assembly 23.

In this figure, the platform at the bottom may be an operating platform of the tooling, the operating platform may be provided with grooves, or clamps, clips etc. adapted to the electrode assembly 23, the electrode assembly 23 is placed on the platform, the platform may be provided with a limiting member to limit the horizontal sliding of the electrode assembly 23, or may be only a plane as a support-ing surface, which also achieves the technical effect of holding the electrode assembly 23.

In another embodiment of the present application, the second holding mechanism 2 includes a magnetic element or a clamping jaw or a chuck or an sticky element, and the second holding mechanism 2 holds the case 22 through the magnetic element or a clamping jaw or a chuck or an sticky element.

In order to hold the case 22 better, the second holding mechanism 2 has a plurality of different arrangement manners, the magnetic element can be used to hold the case 22 made of ferromagnetic material, such as iron, nickel, etc. The clamping jaw can grasp the case 22 in a grasping manner, and the grasping manner is generally more secure, which is less likely to fall off and cause damage to the case 22. The chuck may be sucked on a smooth plane of the case 22, and is applicable to the case 22 having a large-area flat design on the bottom surface. The sticky element may be a sticky rod made of macromolecular material. Generally, this material has good tensile property but relatively poor shear resistance. When the sticky rod is stuck to the bottom surface of the case 22, it can be stuck firmly. It can be released by horizontal rotation when it needs to be removed.

It is also possible to use various kinds of holding components simultaneously, such as attracting one end of the case 22 by means of a magnetic element while clamping the other end by means of a clamping jaw, etc. In the above solution, the state of the case 22 can be more stable by fixing the case 22 by means of a magnetic element/a clamping jaw/a chuck/an sticky element, and the yield of case-put-in can be improved.

In another aspect of the present application, continue to refer to FIG. 1, the second holding mechanism 2 further includes a pressure plate, the pressure plate is connected with the driving mechanism 3, and the driving mechanism 3 is used to drive the pressure plate to move toward the first holding mechanism 1.

The pressure plate is used to provide pressure during the case-put-in process of the electrode assembly 23, during use, generally, the holding component of the second holding mechanism 2 firstly transfers the case 22 from other production line to a position above the electrode assembly 23, then the holding portion is removed, and then pressure plate is attached to the case 22. In some feasible embodiments, the operation of transferring the case 22 is accomplished by other component, and the second holding mechanism 2 only needs to use the pressure plate to contact with the case 22, and the second holding mechanism 2 being a pressure plate can also achieve the effect of holding the case 22.

By driving the electrode assembly 23 through the pressure plate, the whole plane of the pressure plate can be in contact with the bottom surface of the case 22, which can ensure that the force is applied more uniformly during the driving process, so that the battery cell assembly is less likely to rub against the case 22, and finally the yield of the product is improved.

In another aspect of the present application, the processing module 6 is communicatively connected to the driving mechanism 3, and the processing module 6 is used to control start/stop of the driving mechanism 3 based on determining whether the assembling is abnormal. If it is determined to be abnormal, the movement of the driving mechanism 3 is terminated immediately, that is, the driving mechanism 3 is stopped from driving the pressure plate to continue pressing down. By controlling the driving mechanism 3 via the abnormality determining mechanism of the processing module 6, the abnormal situation of the case-put-in state can be fed back in time, so as to prevent the driving mechanism 3 from further pressing the case and causing irreversible damage during an abnormal situation. Therefore, material cost is saved.

Figure 3:
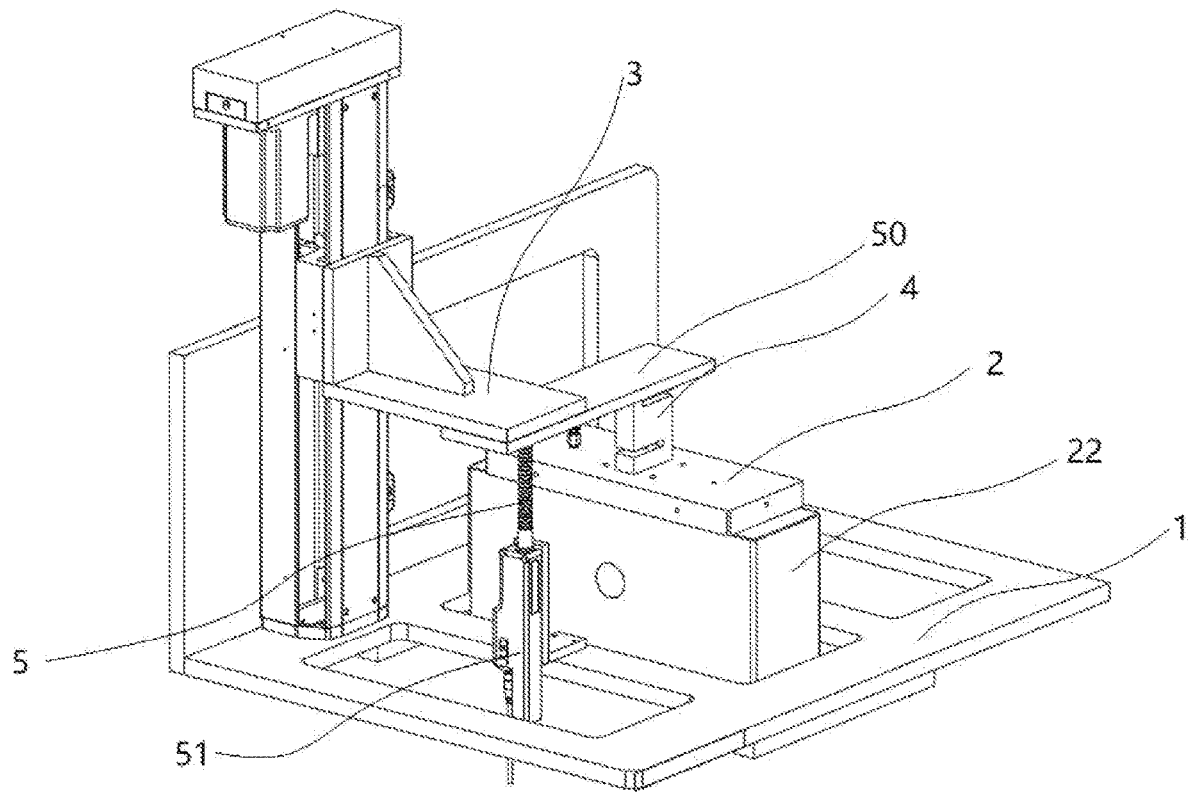
FIG. 3 is a brief schematic diagram of a case-put-in apparatus according to a specific embodiment of the present application.

As one embodiment of the present solution, refer to FIG. 3, a schematic structural diagram of the case-put-in apparatus includes a first holding mechanism 1 and a second holding mechanism 2. As shown in the figure, the first holding mechanism 1 is a platform, and the second holding mechanism 2 is a pressure plate. When the electrode assembly 23 and the case 22 enter the current production line, the platform can be used to support the electrode assembly 23, and the pressure plate contacts the case 22. The pressure plate of the case-put-in apparatus is connected with a pressure detection mechanism 4, the pressure detection mechanism 4 is provided with an adapter plate 50, the other end of the adapter plate 50 is connected with the displacement detection module 5, the adapter plate 50 is also connected with the driving mechanism 3, and the driving mechanism 3 drives the pressure plate through the adapter plate 50. The pressure plate can push the case 22 downward to allow the electrode assembly 23 to be put into the case. The pressure detection mechanism 4 and the displacement detection module 5 are both connected with the processing module 6, and the processing module 6 determines whether the assembling is abnormal according to the value of pressure detected by the pressure detection mechanism 4 and the displacement of the holding mechanism detected by the displacement detection module 5.

Specifically, the processing module 6 may set different pressure thresholds according to the displacements at different times, and simultaneously compare the displacement and the pressure, so that the current case-put-in state can be determined according to different displacement values. For example, different case-put-in states can be divided according to the displacement values before, in and after case-put-in, and perform comparison according to different case-put-in states and different pressure thresholds, so as to determine whether a problem occurs in the process of the case-put-in more accurately. And make an error report.

In some specific embodiments, a digital-to-analog conversion circuit may be further provided in the processing module 6, converting the displacement value and the value of pressure into electrical signals, making different comparison circuits according to the levels corresponding to preset displacement values, for example, states of before, in and after case-put-in are corresponding to three comparison circuits respectively, and finally only one comparison circuit is activated, and a preset level signal representing a preset value of pressure is further connected to each comparison circuit, and then a secondary comparison is performed, so as to finally determine whether there is a problem in the case-put-in state represented by the current displacement and the pressure. Finally, output a determining result after fine comparison.

The foregoing descriptions are merely embodiments of the present application, and are not intended to limit the scope of patent protection of the present application. Any equivalent structure or equivalent process transformation made by using the description and drawings of the present application, or directly or indirectly applied to other relevant technical fields is included in the scope of patent protection of the present application.

The directional words appearing in the following description are all directions shown in the figures, and are not intended to limit the specific structure of the present application. In the description of the present application, it should be noted that unless otherwise expressly specified and defined, the terms "mount," "join," "connect," etc. should be understood in a broad sense, such as, a fixed connection, a detachable connection, or an integral connection; a direct connection, an indirect connection through an intermediate medium. For those of ordinary skill in the art, the specific meanings of the above terms in the present application may be understood according to specific circumstances.

While the present application has been described with reference to the preferred embodiments, various modifications may be made and components therein may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

The invention claimed is:

1. A case-put-in apparatus for battery cell assembling, the battery cell comprising an electrode assembly and a case, wherein the apparatus comprising:
   a holding mechanism for holding the electrode assembly and/or the case,
   a driving mechanism for driving the holding mechanism to assemble the electrode assembly into the case;
   a pressure detection mechanism for detecting a value of pressure on the holding mechanism;
   a displacement detection module for detecting a displacement of the holding mechanism; and
   a processing module communicatively connected to the pressure detection mechanism and the displacement detection module, and used to determine whether the assembling is abnormal according to the value of pressure and the displacement of the holding mechanism.

2. The case-put-in apparatus according to claim 1, wherein the holding mechanism comprising:
   a first holding mechanism for holding the electrode assembly;
   a second holding mechanism for holding the case; and
   a driving mechanism for driving at least one of the first holding mechanism and the second holding mechanism to move.

3. The case-put-in apparatus according to claim 2, wherein the displacement detection module is connected with the second holding mechanism, and is used to detect a displacement of the second holding mechanism.

4. The case-put-in apparatus according to claim 2, wherein the pressure detection mechanism is provided with an adapter plate, and the displacement detection module comprises said adapter plate and a displacement sensor, a first end of the adapter plate being connected to the second holding mechanism, the adapter plate being horizontally disposed, and the displacement sensor being connected to a second end of the adapter plate such that the driving mechanism applies a more direct force to the displacement detection module than to the pressure detection mechanism.

5. The case-put-in apparatus according to claim 2, wherein the displacement detection module is connected with the first holding mechanism, and is used to detect a displacement of the first holding mechanism.

6. The case-put-in apparatus according to claim 2, wherein the first holding mechanism is a platform, and the first holding mechanism supports the electrode assembly.

7. The case-put-in apparatus according to claim 2, wherein the second holding mechanism comprises a magnetic element and/or a clamping jaw and/or a chuck and/or an sticky element, and the second holding mechanism holds the case (via the magnetic element and/or the clamping jaw and/or the chuck and/or the sticky element.

8. The case-put-in apparatus according to claim 2, wherein the second holding mechanism further comprises a pressure plate, the pressure plate is connected with the driving mechanism, and the driving mechanism is used to drive the pressure plate to move toward the first holding mechanism.

9. The case-put-in apparatus according to claim 1, wherein the processing module is communicatively connected to the driving mechanism, and the processing module is used to control start/stop of the driving mechanism based on determining whether the assembling is abnormal.

10. The case-put-in apparatus according to claim 3, wherein the displacement detection module comprises an adapter plate and a displacement sensor, the adapter plate is connected with the second holding mechanism, the adapter plate is horizontally disposed, and the displacement sensor is connected with the adapter plate.

11. The case-put-in apparatus according to claim 3, wherein the second holding mechanism comprises a magnetic element and/or a clamping jaw and/or a chuck and/or an sticky element, and the second holding mechanism holds the case via the magnetic element and/or the clamping jaw and/or the chuck and/or the sticky element.

12. The case-put-in apparatus according to claim 4, wherein the second holding mechanism comprises a magnetic element and/or a clamping jaw and/or a chuck and/or an sticky element, and the second holding mechanism holds the case via the magnetic element and/or the clamping jaw and/or the chuck and/or the sticky element.

13. The case-put-in apparatus according to claim 5, wherein the second holding mechanism comprises a magnetic element and/or a clamping jaw and/or a chuck and/or an sticky element, and the second holding mechanism holds the case via the magnetic element and/or the clamping jaw and/or the chuck and/or the sticky element.

14. The case-put-in apparatus according to claim 6, wherein the second holding mechanism comprises a magnetic element and/or a clamping jaw and/or a chuck and/or an sticky element, and the second holding mechanism holds the case via the magnetic element and/or the clamping jaw and/or the chuck and/or the sticky element.

15. The case-put-in apparatus according to claim 3, wherein the second holding mechanism further comprises a pressure plate, the pressure plate is connected with the driving mechanism, and the driving mechanism is used to drive the pressure plate to move toward the first holding mechanism.

16. The case-put-in apparatus according to claim 4, wherein the second holding mechanism further comprises a pressure plate, the pressure plate is connected with the driving mechanism, and the driving mechanism is used to drive the pressure plate to move toward the first holding mechanism.

17. The case-put-in apparatus according to claim 5, wherein the second holding mechanism further comprises a pressure plate, the pressure plate is connected with the driving mechanism, and the driving mechanism is used to drive the pressure plate to move toward the first holding mechanism.

18. A battery assembling device, comprising the case-put-in apparatus according to claim 1.

\* \* \* \* \*